July 1, 1930.  C. T. MASON  1,769,151
HOOD LATCH
Filed Nov. 26, 1927
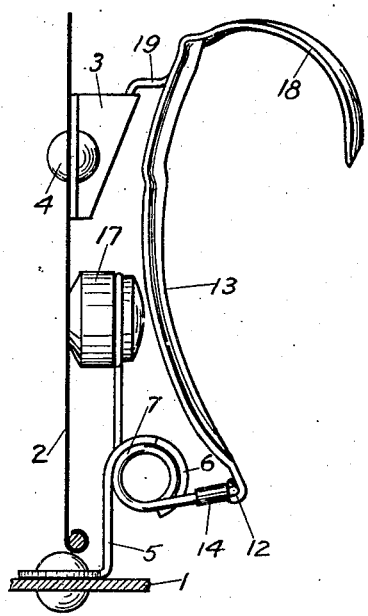
Fig. 1
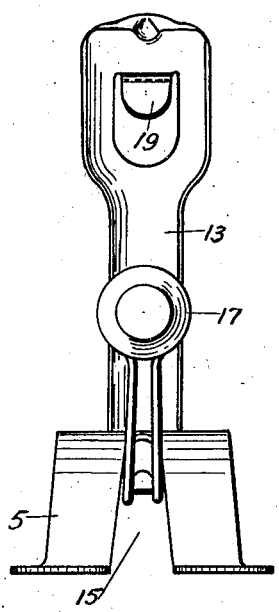
Fig. 2
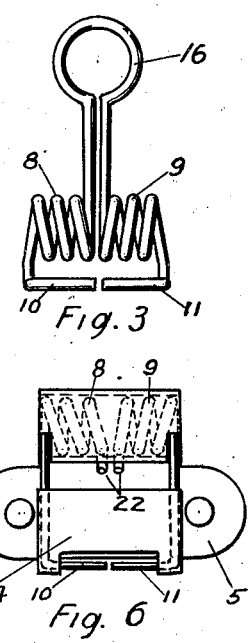
Fig. 3
Fig. 6
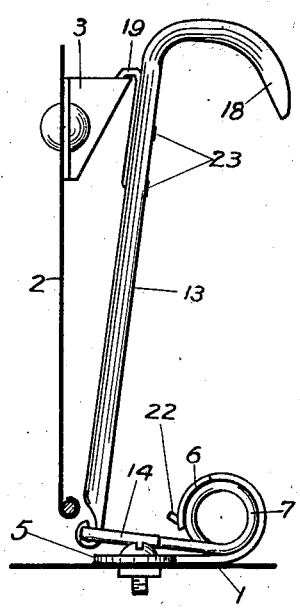
Fig. 4
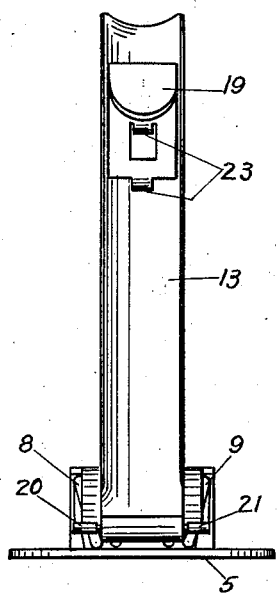
Fig. 5
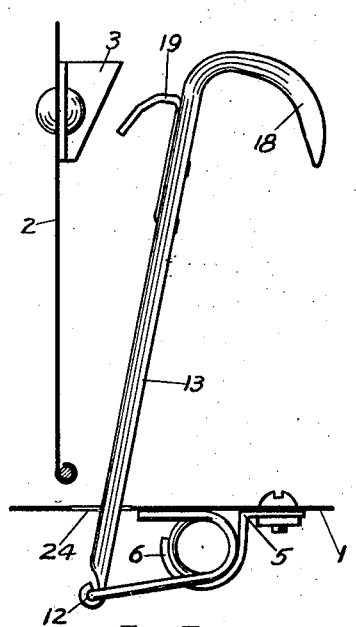
Fig. 7
INVENTOR
CARL T. MASON
BY
A. D. T. Libby
ATTORNEY Patented July 1, 1930

1,769,151

UNITED STATES PATENT OFFICE

CARL T. MASON, OF EAST ORANGE, NEW JERSEY, ASSIGNOR TO TIFFANY MANUFACTURING COMPANY, OF NEWARK, NEW JERSEY

HOOD LATCH

Application filed November 26, 1927. Serial No. 235,797.

This invention relates to a device particularly useful in securing the hood over the engine of an automotive vehicle. It is the principal object of my invention to provide a device of this class, which is simple and cheap to manufacture, yet one which is highly useful and successful in its operation.

This main object, together with ancillary ones, will be readily understood, after reading the following specification taken in connection with the annexed drawing, in which Figure 1 is a side view of one form of my invention, showing the same mounted on a part of the automotive vehicle, and in engagement with the hood.

Figure 2 is a view of the device itself, looking from the left of Figure 1.

Figure 3 is a view of the spring member used in the device, shown in Figures 1 and 2.

Figure 4 is a side elevation of a modified form of the device.

Figure 5 is a view of Figure 4, without the hood, looking from the left, the latch being shown in same position as in Fig. 4.

Figure 6 is a plan view of the bracket without the latch member, which is used in Figures 4 and 5.

Figure 7 is a further modified form of the device.

Referring to the details, wherein like numbers refer to corresponding parts in the various views: 1 is a part of the chassis of an automotive vehicle, 2 illustrates one side of the hood, which is placed over the engine and which has a rear bearing on the cowl, and a front bearing on a part of the radiator support frame. To the hood 2 is attached a member 3, in any satisfactory manner, as by rivets 4; mounted on the part 1 is a bracket 5, having a portion 6 turned over so as to form a receptacle or pocket, which carries a spring 7.

As shown in Figures 1 and 2 the spring 7 is made up out of one piece of material formed in two sections 8 and 9, wound in reverse direction. The ends 10 and 11 of the sections 8 and 9 are bent over so as to engage an eye 12 in the end of a latch 13. In order to insure that the ends 10 and 11 do not come out of the eye 12, a clamping member 14 is passed over the parts of the spring closely adjacent the eye 12.

As shown in Figure 2, the adjacent ends of sections 8 and 9 project upwardly through a slot or opening 15, in the bracket 5 and terminate in a holder 16, which is adapted to receive a pressure member 17, which is adapted to press against the hood 2, to assist in holding it in position, and prevent its rattling. The member 17 is preferably of soft rubber, and is provided with a groove so that it may be forced into the seat or holder 16, where it is securely held in position. The member 17 thus acts as an anti-rattling device. The upper end of the latch 13 is provided with a pull member 18 and a catch 19, preferably made integral with the latch 13, (Fig. 2). This catch 19 is adapted to engage the number 3 on the hood 2.

In operation, it will be seen that by pulling upwardly on the pull member 18, the latch 13 is lifted upwardly against the torsion spring 7, which may rotate within the pocket 6, until the pressure member 17 engages the hood, after which further strain on the latch 13, tensions the spring so that when the catch 19 is moved into latching engagement with the member 3, the spring is under considerable tension, and holds the latch 13 securely in position, as well as putting continued pressure through the member 17 on the hood 2. In the form shown in Figure 4, the pressure device 17 is omitted and the bracket 5 is of a slightly different shape. Furthermore the clamp 14 is wider and has parts 20 and 21 formed over the bent ends 10 and 11 of the spring 7. In the device shown in Figures 4, 5, 6, and 7 the spring is made in two pieces, the sections 8 and 9 however, are preferably made in the same manner as shown in Figure 3, by having their ends 22 adapted to lie in a notch in the wall of the pocket 6. In these later forms, the hook or catch 19 is illustrated as being made of a separate part having lugs 23, passing through the latch 13, and riveted over on the opposite side as shown in Figure 4.

In Figure 7, the bracket 5 is shown mounted below the frame member 1, and the latch 13 passes through an opening or slot 24 in the member 1. As will be seen from this figure this latter construction, provides a concealment for the spring, and the bracket, thus presenting a smoother and cleaner appearance on the vehicle; at the same time the openings 24 provide places for water, coming from the hood and fenders to run off.

While I have shown various forms of applying my invention, it will be understood that the details may be varied, without departing from the spirit of the invention or the scope of the appended claims.

Having thus described my invention, what I claim is:

1. In a device of the class described a bracket having a portion bent over forming a pocket, a latch having a pull member and a catch at one end, and a torsional spring device positioned in said pocket and having an operative engagement with the other end of the latch.

2. In a device of the class described, a bracket having a portion bent over forming a pocket, a latch having a pull member and a catch at one end, and a torsional spring device composed of two sections wound in reverse direction positioned in said pocket and having an operative engagement with the other end of the latch.

3. In a device of the class described, a bracket having a portion bent over forming a pocket, a latch having a pull member and a catch at one end, and an eye at the opposite end, and a torsional spring device composed of two sections arranged in tandem with their adjacent inner ends engaging the wall of said pocket while the outer ends are bent to enter said eye.

4. In a hold down device for the hood of an automotive vehicle, a bracket adapted to be fastened to a part of the frame of the vehicle, a latch having a pull member and a catch to engage a part of the hood and a torsional spring carried by the bracket and having one end attached to the latch and its free end extending upward through a slot in the bracket, said free end carrying a pressure member for engaging the hood as the latch is pulled into latching engagement with the hood due to the strain placed on the spring.

5. In a hold down device for the hood of an automotive vehicle, a bracket adapted to be fastened to a part of the chassis of the vehicle, a latch having a pull member and a catch to engage a part of the hood and a torsional spring carried by the bracket, said spring being arranged in two sections having one pair of ends attached to one end of the latch while the other pair of ends carry an anti-rattle member which is forced into engagement with the hood as the latch is pulled to latching engagement.

6. In a hold down device for the hood of an automotive vehicle, a bracket adapted to be fastened to a part of the chassis of the vehicle, a latch having a pull member and a catch to engage a part of the hood and a torsional spring carried by the bracket, said spring being in one piece and arranged in two sections wound in reverse direction with two ends of the sections attached to the latch while the other ends of the sections extend upward through the bracket and are formed so as to carry an anti-rattle device which is forced into engagement with the hood as the latch is pulled to latching engagement.

7. A hold down device for the hood of an automotive vehicle comprising a bracket, a latch and a spring carried by the bracket and operatively connected to the latch and having a part formed upward and carrying a pressure member thereon adapted to be brought against the hood when the latch is drawn into latching position.

8. A hold down device for the hood of an automotive vehicle comprising a bracket having a portion formed into a pocket, a latch having a pull member and a catch, a torsional spring carried by said pocket and having a pair of ends operatively connected to the latch while another part of the spring is formed upward in the direction of the latch, a bumper carried on the end of said upwardly extending spring end and adapted to be brought against the hood when the latch is drawn up so the catch thereon engages the hood.

In testimony whereof, I affix my signature.

CARL T. MASON.